United States Patent [19]

Taylor et al.

[11] 4,354,664

[45] Oct. 19, 1982

[54] FAIL-SAFE VALVE

[75] Inventors: Dan G. Taylor, Erie; Walter W. Robertson, Cranesville, both of Pa.

[73] Assignee: Hydro-Pac, Inc., Fairview, Pa.

[21] Appl. No.: 215,001

[22] Filed: Dec. 10, 1980

[51] Int. Cl.³ .............................................. F16K 1/32
[52] U.S. Cl. .................................. 251/282; 251/321; 251/367
[58] Field of Search ............... 251/282, 321, 324, 367; 137/625.69

[56] References Cited

U.S. PATENT DOCUMENTS

| | | | |
|---|---|---|---|
| 3,370,613 | 2/1968 | Weaver | 137/625.69 |
| 3,774,877 | 11/1973 | Robertson | 251/282 |
| 3,847,374 | 11/1974 | Tittelbach | 251/367 |

*Primary Examiner*—H. Jay Spiegel
*Attorney, Agent, or Firm*—Ralph Hammar

[57] ABSTRACT

The valve of U.S. Pat. No. 3,774,877 in which have valve operating pistons are mounted in a tubular sleeve received in a bore in a two part valve body, one part containing the connection for P1 and the other part containing the connection for P2 and the valve port.

1 Claim, 2 Drawing Figures

FAIL-SAFE VALVE

This invention is a balanced valve in which the moving valve operating member comprises two parts acting in series and respectively exerting a closing force from the inlet and outlet pressures. The valve has fail-safe properties since both pressures are usable to bias the valve closed.

Figures 1, 2:
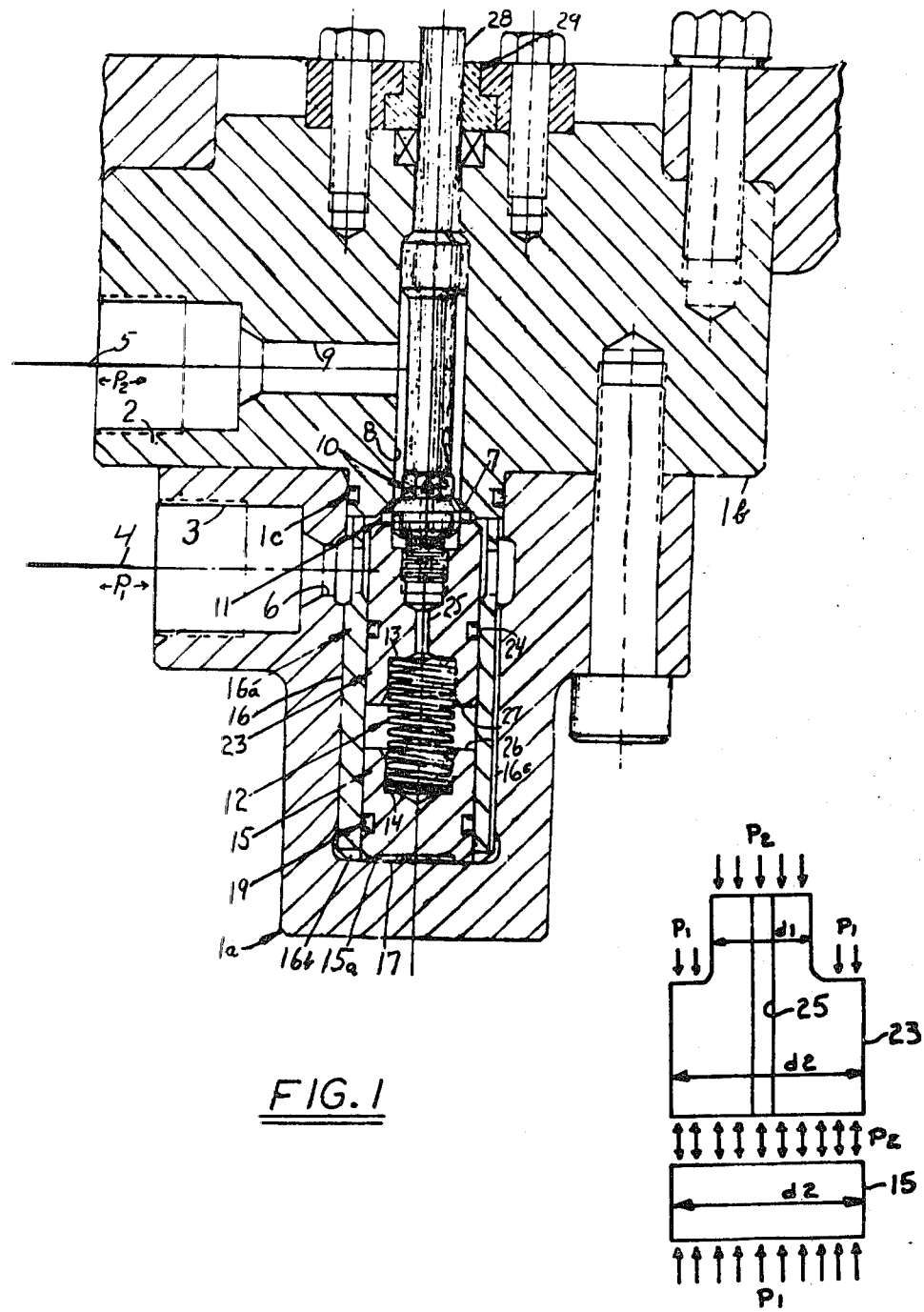
FIG. 1 is a section through a valve.
FIG. 2 is a free body diagram of the pressure forces on the moving valve operating member.

The valve body 1a, 1b has fittings 2, 3 one of which may be an inlet fitting and the other of which may be an outlet fitting. In service, fitting 3 is connected to a line 4 carrying a pressure P1 and fitting 2 is connected to a line 5 carrying a pressure P2. The body sections 1a, 1b are bolted together, and before bolting may be turned relative to each other to provide different orientation of the fittings to accommodate the lines 4, 5. In the particular valve shown, the body sections are oriented so the fittings 2, 3 are zero degrees from each other. The orientation may be changed in 90 degree steps or other, depending upon the number of screws holding the two together. In all positions the body sections are sealed by seal 1c. A way 6 leads from fitting 3 to one side of a valve seat 7 leading to a valve port 8. The fitting 2 leads to a way 9 connected to the valve port on the opposite side of the seat 7. Flow through the valve port 8 is controlled by a valve member 10 having a sealing element 11 closing against the valve seat. The valve member 10 is biased to the closed position by a spring 12 arranged between a seat 13 on a piston 23 carrying the valve member and a seat 14 on a piston 15 slidable in a sleeve 16a received in a bore 16 in the body. Pistons 23 and 15 are in slidable sealing engagement with the sleeve 16a. The piston 15 has spaced feet 15a which bottom on the bottom wall 17 of the bore 16 in which the sleeve 16a is received. The lower end of the sleeve has notches 16b which cooperate with the spaces between the feet 15a to supply fluid at pressure P1 to the bottom of the piston 15. Fluid at pressure P1 reaches the bottom of the piston 15 through openings 16b and an external groove 16c in the sleeve. A sealing element 19 seals the piston 15 to the bore of the sleeve 16a.

Above the piston 15 is a piston 23 sealed to the sleeve 16a by a sealing element 24. The upper end of the piston 23 is fixed to the valve member 10. A way 25 conducts pressure P2 to the space between the upper end of piston 15 and the lower end of piston 23. Pressure P2 accordingly is at all times present and exerting a downward force on the piston 15 and an upward or valve closing force on the lower end of the piston 23. Seals 11, 24 and 19 prevent escape of pressure P2 under this condition.

There are several conditions under which the valve will be closed. First, when P1 and P2 are both equal to zero, the valve member 10 will be closed by the spring 12. This will also be true for all other conditions under which P1 is equal to P2. Second, when P2 is greater than P1, the piston 15 will be held in its lowermost position as shown in FIG. 1, and the valve member 10 will be held in its closed position by the force acting on the lower end of piston 23 which is greater than the downward force acting on the portion of the upper end of the piston 23 within the valve sealing element 11. Third, when P1 is greater than P2, the piston 15 will be raised so that its surface 26 abuts the lower end surface 27 of the piston 23 and holds the piston 23 in its uppermost position as shown in FIG. 1.

The forces are shown in the free body diagram of FIG. 2 where the diameter of the piston 23 within the valve seal 11 is indicated at d1 and the diameter of the piston 15 and of the lower end of the piston 23 is indicated at d2. From this diagram it can be determined that when P1 is greater than or equal to P2, the closing force is equal to $(P1-P2)\pi/4 \; d1^2$, a force which becomes zero when P1 is equal to P2. When P2 is greater than P1, the closing force is equal to $(P2-P1)(d2^2-d1^2)\pi/4$. The valve, therefore, fails-safe in the sense that it is biased to the closed position under all conditions.

The valve is opened by a push rod 28 extending into the valve body 1 through a stuffing box 29 and having its lower end 30 abutting the upper end of the valve member 10. When the push rod 28 is urged downward, it pushes the valve member 10 away from the valve seat 7 and opens the valve. Any suitable structure may be used for actuating the push rod 28.

What is claimed is:

1. A valve for controlling the flow between pressures P1 and P2 comprising
   a first body having a connection to P1 and a second body having a connection to P2, said bodies being in direct contact with each other and capable of being turned relative to each other to provide different orientations of the connections to P1 and P2, means for bolting the bodies together, a flow path between said connections, a port in the second body in said flow path, a valve member for opening and closing said port, means for closing the valve comprising first and second pistons for exerting a force on said valve member in one direction to close said port, a sleeve in said first body having its upper end communicating with P1 and surrounding said port and said pistons, said pistons being slidable in said sleeve, a seal between each piston and said sleeve below the upper end of the sleeve,
   said first piston having one side facing said one direction, a way from top to bottom in the outer surface of the sleeve leading from P1 to the other side of said first piston for supplying pressure P1 exerting a force on said first piston in said one direction,
   said second piston having one side facing said one direction and in force transmitting relation to said valve member and the other side presented to said one side of the first piston, a way leading from P2 to the other side of said second piston for supplying pressure P2 exerting a force on said second piston in said one direction and for exerting a force on said one side of the first piston in the opposite direction,
   means for opening the valve,
   and a force transmitting biasing means between said pistons for transmitting forces from one piston to the other.

* * * * *